US006959192B1

(12) United States Patent
Cannon et al.

(10) Patent No.: US 6,959,192 B1
(45) Date of Patent: Oct. 25, 2005

(54) SYSTEM AND METHOD FOR UPDATING STORED INFORMATION PORTABLE ELECTRONIC DEVICES BASED ON GEOGRAPHIC LOCATION

(75) Inventors: Joseph M. Cannon, Montgomery, PA (US); James A. Johanson, Lehigh, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/705,694

(22) Filed: Nov. 6, 2000

(51) Int. Cl.⁷ ............................................. H04Q 7/20
(52) U.S. Cl. ................... 455/456.3; 455/414.1
(58) Field of Search ................ 455/456, 457, 455/435, 432, 427, 418, 419, 414, 550, 564, 455/566

(56) References Cited

U.S. PATENT DOCUMENTS

| 5,305,372 | A | * | 4/1994 | Tomiyori ............... 455/564 X |
| 5,579,535 | A | * | 11/1996 | Orlen et al. ........... 455/456 X |
| 5,732,349 | A | * | 3/1998 | Sanpei et al. .......... 455/435 X |
| 5,905,957 | A | * | 5/1999 | Olds ..................... 455/456 X |
| 6,085,098 | A | * | 7/2000 | Moon et al. ............ 455/456 |
| 6,201,963 | B1 | * | 3/2001 | Nakamura .............. 455/435 |
| 6,282,431 | B1 | * | 8/2001 | Konno ................... 455/566 X |
| 6,292,666 | B1 | * | 9/2001 | Siddiqui et al. ........ 455/456 X |
| 6,529,728 | B1 | * | 3/2003 | Pfeffer et al. .......... 455/418 |

* cited by examiner

Primary Examiner—Nay Maung
Assistant Examiner—Philip J Sobutka

(57) ABSTRACT

A method and system for updating information stored in portable electronic devices based on the geographic location of the electronic devices is disclosed. The portable electronic devices are provided with built-in transceiver modules which will automatically communicate with base stations provided at centralized high traffic locations. The base stations transmit low power radio signals to the portable devices that contain commands for the devices to automatically update information stored in the portable devices based on the geographic area, such as for example updating to a new telephone area code or time zone. Additionally, a global positioning satellite (GPS) system can be utilized to automatically set the transceiver modules in the portable electronic devices to the proper frequency at which the base stations are transmitting thereby ensuring a communication link between the base station and the portable electronic device. Alternatively, a GPS system can be utilized to update information stored in the portable electronic devices based on the geographic location of the electronic devices.

42 Claims, 3 Drawing Sheets

SYSTEM AND METHOD FOR UPDATING STORED INFORMATION PORTABLE ELECTRONIC DEVICES BASED ON GEOGRAPHIC LOCATION

BACKGROUND OF THE INVENTION

1. Field of the Invention

The present invention relates generally to portable electronic devices, and more particularly to a method and system for updating stored information in the portable electronic devices based on the geographic location of the electronic devices.

2. Description of the Related Art

In recent years, public use of portable electronic devices, such as for example wireless communication devices, i.e., cell phones, personal data assistants (PDAs), personal computers, and the like, have increased greatly. Because of their mobility, such devices must be light and compact. A user needs to be able to comfortably carry the device in a pocket, purse or briefcase. Many of these devices are typically provided with several user friendly functions, such as for example scheduling assistants, stored phone numbers for speed dialing, clocks, calendars and the like.

Despite all of the technological advancements, such portable electronic devices are not without their shortcomings. For example, while many of the electronic devices allow a user to program certain information, such as frequently dialed telephone numbers, important meeting reminders, etc. into the memory for later rapid dialing or notification, this programming function must be performed manually. Manual programming of the electronic device can take time and requires the user to remember how to perform the steps required to carry out the programming function.

The user can refer to the device's user manual to determine the steps required to properly program the desired information into the device. This, however, is not preferred since these manuals are rarely, if ever, carried around with the device.

The problem of updating or reprogramming information stored in the portable electronic devices is further exacerbated if the user often travels outside of his local geographic region. For example, the telephone numbers stored in the speed dial function typically assume the call will be made within the user's typical local area and therefore generally are not provided with an area code. If the user travels outside of his local area and into a different area code or country, the speed dial function will no longer work as the area code and possibly a country code will be required to place the call.

Additionally, as global travel becomes more prevalent, other functions provided by the portable electronic devices will also be compromised unless the devices are updated or reprogrammed. For example, when the user travels to a different country or time zone, not only will the speed dial numbers no longer operate correctly but the clock and/or calendar functions will also be incorrect due to the time zone change. As noted above, the updating of the stored information and/or operating systems of the electronic device must be performed manually, which requires time and effort on the part of the user.

Thus, there exists a need for a system and method that will automatically update stored information in portable electronic devices based on the geographic location of the electronic device.

SUMMARY OF THE INVENTION

The present invention overcomes the problems associated with the prior art and provides a unique method and system for updating stored information in portable electronic devices based on the geographic location of the electronic device.

In accordance with one aspect of the present invention, portable electronic devices are provided with built-in transceiver modules which will automatically communicate with base stations provided at centralized high traffic locations, such as for example airports, train stations, bridges, toll booths, bus stations, etc. The base stations transmit low power radio signals to the portable devices that contain commands for the devices to update information stored in the portable devices based on the geographic area, such as for example updating to a new telephone area code or time zone. Accordingly, the portable electronic devices will work seamlessly in the new location without any manual intervention required by the user.

In accordance with another aspect of the invention, a global positioning satellite (GPS) system can be utilized to automatically set the transceiver modules in the portable electronic devices to the proper frequency at which the base stations are transmitting thereby ensuring a communication link between the base station and the portable electronic device.

In accordance with another aspect of the invention, a GPS system is used to update information stored in portable electronic devices based on the location of the device as determined by the GPS system.

These and other advantages and features of the invention will become apparent from the following detailed description of the invention which is provided in connection with the accompanying drawings.

DETAILED DESCRIPTION

Figure 1:
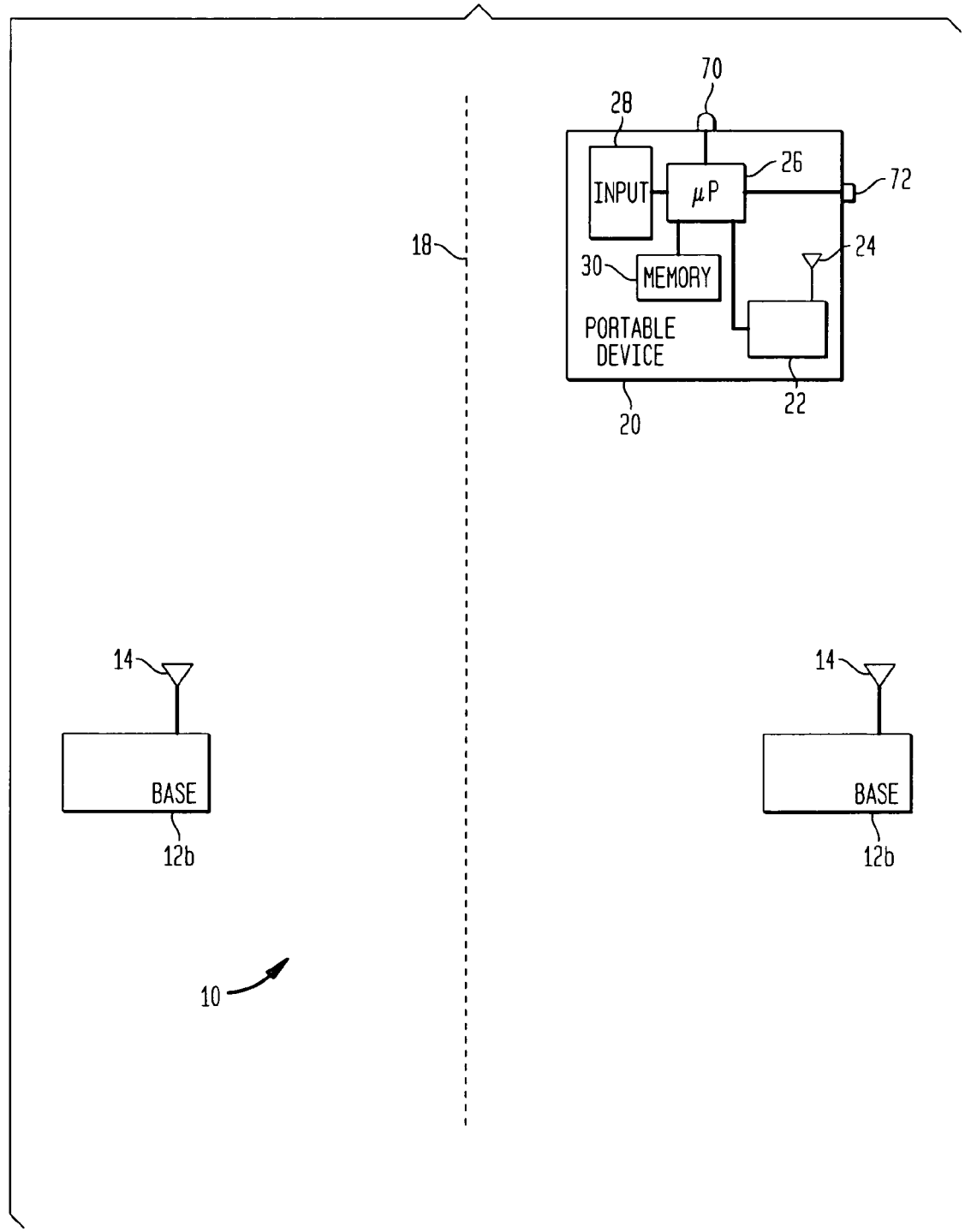
FIG. 1 illustrates in block diagram form a system for updating stored information in a portable electronic device based on the geographic location of the electronic device in accordance with the present invention.

The present invention will be described as set forth in the preferred embodiments illustrated in FIGS. 1–3. Other embodiments may be utilized and structural, logical or programming changes may be made without departing from the spirit or scope of the present invention. Like items are referred to by like reference numerals throughout the description.

In accordance with the present invention, stored information in portable electronic devices is updated based on the geographic location of the electronic device. FIG. 1 illustrates in block diagram form a system 10 for updating stored information in a portable electronic device 20 based on the geographic location of the electronic device in accordance with the present invention.

Figure 2:
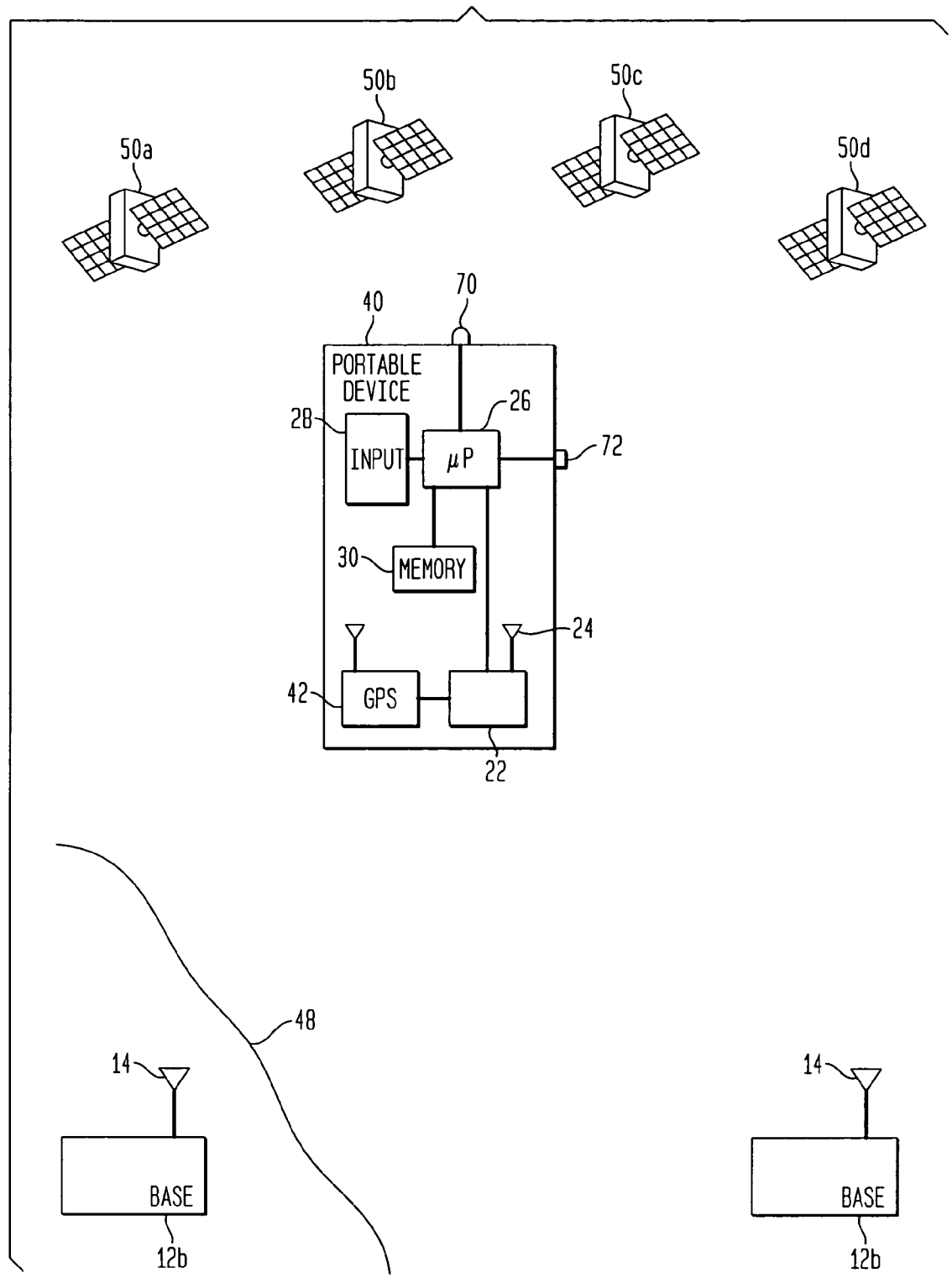
FIG. 2 illustrates in block diagram form use of a GPS system to automatically set the transceiver modules in the portable electronic device of FIG. 1 to the proper frequency at which the base stations are transmitting in accordance with the present invention.

As illustrated in FIG. 1, a portable electronic device 20, such as for example a wireless telephone, PDA, laptop computer, wristwatch or the like, is provided with a transceiver 22 connected to a microprocessor 26 in the device 20. Transceiver 22 is provided with antenna 24 for transmitting and receiving radio signals. Device 20 may be provided with a user input device 28, such as for example a keypad, keyboard, mouse, etc., for inputting information for storage in memory 30. For example, the device 20 may have a speed dial function which allows for storage of telephone numbers in memory 30, or may be provided with a scheduling assistant for storing the date and time of appointments and providing a reminder.

A plurality of base stations 12, such as for example base stations 12a and 12b of FIG. 1, are provided at different geographic locations. Each base station 12 has an antenna for transmitting and receiving radio signals that contain location specific information, such as for example the date, time zone and area code of the geographic region in which the base station 12 is situated. The base stations 12 are strategically placed at predetermined locations where a high volume of traffic from different geographic areas passes. For example, the base stations 12 may be located at airports, train stations, bus stations, toll booths, bridges, border crossing checkpoints, etc. Preferably, the base stations 12 are situated such that passengers passing through these portals will come in close proximity to the base stations 12, such as for example passageways leading from the exit of an airplane, train or bus to the terminal. As illustrated in FIG. 1, base station 12a may be located in a first time zone, such as for example eastern standard time, while the base station 12b may be located on the other side of time zone change line 18 in a second time zone, such as for example central standard time. Alternatively, base stations 12 may be provided in different locations served by different area codes for telephone numbers.

In accordance with the present invention, if device 20 crosses time line 18 to a different time zone and an area served by a different area code, base station 12b will automatically communicate with device 20, causing device 20 to update location dependent information stored in memory 30. For example, suppose all information stored in memory 30 of device 20, such as for example telephone numbers, appointments, etc., is stored based on the device being located in a home location, such as for example in the eastern time zone and a specific area code. If device 20 crosses time line 18 and thus enters to a location in a different time zone and/or served by a different area code, radio signals from base station 12b will be received by device 20 when device 20 is within range of base station 12b. As noted above, the radio signals from base station 12b include the area code and time zone of the geographic region in which base station 12b is situated. When the signals from base station 12b are received by transceiver 22, the information contained in the radio signals is provided to the microprocessor 16 which can then update information stored in memory 30. For example, the system clock could be reset to the new time zone, thereby ensuring that any appointment reminders are still correct. Additionally, if a date line is crossed, the system date would also be updated.

With respect to telephone numbers stored in memory 30 of device 20, when transceiver 22 sends a signal to processor 26 indicating device 20 has entered a location served by a different area code, processor 26 can reference a look-up table in memory 30 to provide a new set of speed dial numbers in which the area code is also provided. For example, suppose all telephone numbers stored in memory 30 are stored with the assumption that the calls will always be made from the same area code which serves those numbers. Thus, the numbers will be stored as seven digit numbers, as the area code is generally not necessary when making local calls. When device 20 enters an area served by a different area code, it will now be necessary to dial the area code prefix along with the seven digit numbers stored in the memory 30. The area code for the telephone numbers stored in memory 30 can also be stored in a look-up table in memory 30 and inserted into the speed dial numbers when device 20 enters an area served by a different area code.

It should be understood that updating of the telephone numbers stored in memory 30 is performed independently of updating the system clock and calendar of device 20. Thus, the present invention is not limited to crossing only a time line, but is also equally applicable to areas served by different area codes or different country codes.

In order for each base station 12 to be able to communicate with any portable device 20 provided with a transceiver 22, it is necessary to establish a certain protocol for these devices. One exemplary protocol is known as Bluetooth™. Bluetooth™ is a radio frequency standard that describes how portable electronic devices, such as wireless telephones, PDAs, and personal computers, can easily interconnect with each other and with home and business phones and computers using a short-range wireless connection. The Bluetooth™ specification ensures that diverse devices supporting the Bluetooth™ technology can communicate with each other worldwide. The Bluetooth™ protocol allows for the automatic connections between the devices without any user intervention. Thus, when Bluetooth™ equipped devices come within range of one another, such as for example when device 20 comes in range of base station 12b, the device 20 and base station 12b will communicate with each other via a radio frequency link to determine if they have information to share or whether one needs to control the other. In accordance with the present invention, base station 12b will share information concerning the local time zone, date, area code, etc. in which base station 12b is situated. Device 20, upon receiving this information from base station 12b, will update any information stored in memory 30 that might be affected by the change in location of device 20 as previously described.

Thus, in accordance with the present invention, stored information in portable electronic devices is automatically updated based on the geographic location of the electronic device.

As previously noted, the use of the present invention is applicable to when a portable electronic device travels into a geographic location in a new time zone or a new country. If the Bluetooth™ protocol is utilized, it will be necessary to update the country code within the Bluetooth™ transceivers in the electronic devices to ensure the devices are operating on the proper frequencies. Bluetooth™ utilizes a technique called spread-spectrum frequency hopping, in which multiple randomly chosen frequencies within a designated range are utilized, with the chosen frequency changing on a regular basis. By regularly changing the frequencies within the given range, Bluetooth™ devices are prevented from interfering with one another as it is unlikely that more than one device within range will be on the same frequency at the same time. In Bluetooth™, the transmitters change frequencies 1,600 times every second. When an initial conversation between Bluetooth™ devices has occurred, such as for example between a device 20 and base station 12b of FIG. 1, a piconet, or small network, is created between device 20 and base station 12b and device 20 and base station 12b will randomly hop frequencies in unison to maintain the transfer of data.

The Bluetooth™ standard specifies the frequencies and number of channels at which the devices will communicate. The channel spacing is 1 MHz, and a guard band, typically several MHz wide, is provided at the upper and lower band edge. In addition, each country or specified groups of countries are given a unique code. The country codes and the corresponding frequencies for some countries are listed in Table 1 below.

TABLE 1

| Geographic Area | Country Code | Frequency Range (MHz) | No. of Channels |
|---|---|---|---|
| US and Europe | 00 | 2400–2483.5 | 79 |
| Spain | 01 | 2445–2475 | 23 |
| France | 02 | 2446.5–2483.5 | 23 |
| Japan | 03 | 2471–2497 | 23 |

Any device equipped with Bluetooth™ must update its country code when it passes from one country to another in order to properly work, and additionally so that it will not violate any type of local regulations regarding transmission frequencies, such as for example FCC regulations in the US.

In accordance with another aspect of the present invention, a global positioning satellite (GPS) system can be utilized to automatically set Bluetooth™ devices to the proper country code, and hence corresponding proper frequencies, for that country. FIG. 2 illustrates in block diagram form use of a GPS system to automatically set a Bluetooth™ equipped device to the proper country code in accordance with the present invention.

GPS systems are used to determine or fix the position of a receiver using signals transmitted simultaneously from several satellites. As illustrated in FIG. 2, satellites 50a, 50b, 50c, 50n are used to determine the position of portable device 40. Device 40 is similar to device 20 of FIG. 1, and additionally includes a GPS receiver 42 which is able to receive the transmissions of those satellites that are "in view" (i.e., not blocked by the curvature of the earth). The receiver 42 uses the arrival time differences between the received simultaneously transmitted signals, along with satellite Doppler, position data and other data embedded in the simultaneously transmitted signals, to calculate the position of the receiver 42 and correspondingly the position of device 40. The result is provided in the form of a geographic position—longitude and latitude—typically accurate within 100 meters. GPS receiver 42 will provide the geographic position to transceiver 22. Based on the geographic position from GPS receiver 42, transceiver 22 can then determine the current country in which the device 40 is located and set the country code accordingly.

Thus, suppose for example device 40 is crossing over border 48 from one country to another, such as for example France to Spain. When device 40 is in Spain and operating according to the Bluetooth™ specification, it will be utilizing the frequency range of 2445–2475 MHz associated with country code 01 for Spain. When device 40 crosses border 48 into France, GPS receiver will provide the geographic position of device 40 to transceiver 22, which can then determine that device 40 has moved into a new country, such as for example by a look-up table that stores longitude and latitude data with respect to country location, and transceiver 22 can automatically update the country code to 02 for France and adjust its operating frequency to 2446.5–2483.5 MHz. Device 40 can then establish a communication with base station 12b and information stored in memory 30 of device 40 can be updated by signals from base station 12b as described with respect to FIG. 1.

Thus, in accordance with the present invention, a global positioning satellite (GPS) system can be utilized to automatically set Bluetooth™ devices to the proper country code, and hence corresponding proper frequencies, for that country.

Figure 3:
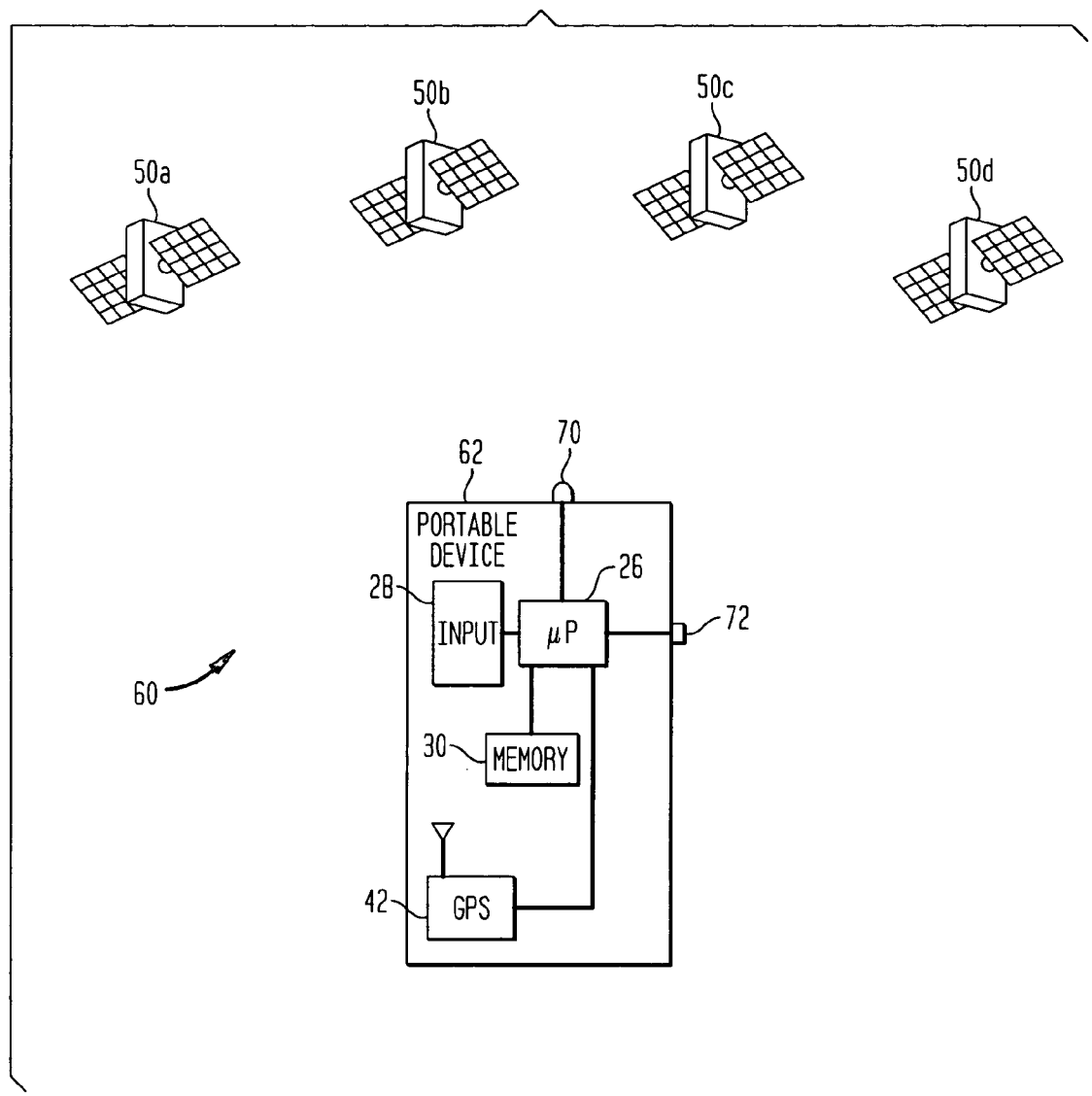
FIG. 3 illustrates in block diagram form a system for updating stored information in a portable electronic device based on the geographic location of the electronic device in accordance with another embodiment of the present invention.

FIG. 3 illustrates in block diagram form a system 60 for automatically updating stored information in a portable electronic device based on the geographic location of the electronic device in accordance with another embodiment of the present invention. In system 60, a GPS system is used to determine a current geographic position of the device. Based on the current geographic position of the device, its current geographic location, such as for example state or country, is determined and the information stored in portable electronic devices is automatically updated based on the geographic location of the device.

As illustrated in FIG. 3, a portable device 60 includes a processor 26 coupled to a memory 30 and a user input device 28 similar to device 20 described with respect to FIG. 1. In system 60, satellites 50a, 50b, 50c, 50n are used to determine the geographic position of portable device 60. Device 60 additionally includes a GPS receiver 42 which is able to receive the transmissions of those satellites that are "in view" (i.e., not blocked by the curvature of the earth). The operation of receiver 42 is similar to that as described with respect to FIG. 2. GPS receiver 42 will provide the determined geographic position to processor 26. Based on the geographic position from GPS receiver 42, processor 26 can reference look-up tables in memory 30 to retrieve information specific to the current geographic location, i.e., time zone, area code, country code, etc. of the location in which the device 62 is currently located and then update information stored in memory 30. Accordingly, the information stored in memory 30 will be automatically updated based on the geographic location of the portable device 62.

While the invention has been described with respect to information stored in a portable electronic device being automatically updated when the portable electronic device enters a new geographic location, the invention is not so limited. For example, it may be desired for the information stored in the electronic device to be updated only at certain times. Accordingly, the automatic update feature could be disabled by a user, and the user could select when an update should occur by enabling the automatic update feature of the present invention. Additionally, the portable electronic device could be provided with an indicator 70, such as for example an LED or speaker to provide an audible tone, indicating that information received from a base station or GPS system necessitates an update to stored information. For example, when processor 26 determines that the information stored in memory 30 should be updated based on information received from transceiver 22, it will activate indicator 70. A user could then select whether or not to have the stored information updated by processor 26 activating a control button 72 on the electronic device.

Reference has been made to preferred embodiments in describing the invention. However, additions, deletions, substitutions, or other modifications which would fall within the scope of the invention defined in the claims may be implemented by those skilled in the art and familiar with the disclosure of the invention without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A system for updating information stored in a memory of a portable electronic device, said system comprising:
   a plurality of base stations, each of said plurality of base stations being located at a respective geographic location and transmitting a radio signal including information specific to said respective geographic location; and
   a transceiver in said portable electronic device, said transceiver being arranged and configured such that when said portable electronic device comes into range of one of said plurality of base stations, said portable electronic device automatically receives said radio signal from said one of said plurality of base stations, said information is received by said transceiver and provided to a microprocessor in said portable electronic device, and based on said information in said radio signal said information stored in said memory of said portable electronic device is updated without making a determination of a portable electronic device location and whether said information should be updated.

2. The system of claim 1, wherein said update of said location dependent information stored in said memory of said portable electronic device is done automatically without any intervention from a user.

3. The system of claim 1, wherein said location dependent information stored in said memory of said portable electronic device includes a telephone number for a speed dial function.

4. The system of claim 1, wherein said location dependent information stored in said memory of said portable electronic device includes a calendar.

5. The system of claim 1, wherein said location dependent information stored in said memory of said portable electronic device includes a clock.

6. The system of claim 1, wherein said location specific information included in said radio signal includes a time zone.

7. The system of claim 1, wherein said location specific information included in said radio signal includes a telephone area code associated with said respective geographic location.

8. The system of claim 1, wherein said location specific information included in said radio signal includes a date.

9. The system according to claim 1, wherein said location specific information included in said radio signal includes a telephone country code associated with said respective geographic location.

10. The system according to claim 1, wherein each of said plurality of base stations transmits said radio signal in a predefined range of frequencies.

11. The system according to claim 10, wherein said predefined range of frequencies is associated with a country code, and said transceiver is set to receive said predefined range of frequencies based on said country code.

12. The system according to claim 1, wherein said plurality of base stations and said portable electronic device are Bluetooth™ compliant.

13. The system according to claim 1, wherein said radio signal is low powered.

14. The system according to claim 1, wherein said base stations are provided at centralized high traffic locations where high volumes of traffic from different geographic areas pass.

15. The system of according to claim 14, wherein said centralized high traffic locations include airports, train stations, bridges, toll booths, and bus stations.

16. The system according to claim 1, further comprising reference tables stored in the memory of the portable electronic device, information specific to a current geographic location being retrieved from the reference tables to update said location dependent information stored in memory.

17. A portable electronic device comprising:
    a processor;
    a memory coupled to said processor, said memory storing location dependent information; and
    a receiver coupled to said processor, said receiver being arranged and configured to automatically receive radio signals when said portable electronic device comes into range of one of a plurality of base stations, said radio signals including location specific information specific to a geographic location, and to provide said location specific information to said processor,
    wherein said processor is arranged and configured to update said location dependent information stored in said memory based on said location specific information in response to automatically receiving said location specific information from said receiver without a determination of portable electronic device location and whether said information should be updated.

18. The device according to claim 17, wherein said update of said location dependent information stored in said memory of said portable electronic device is done automatically without any intervention from a user.

19. The device according to claim 17, wherein said processor in response to receiving said location specific information from said receiver provides an indication of receipt of said location specific information from said receiver before updating said location dependent information stored in said memory.

20. The device according to claim 17, wherein said location dependent information stored in said memory includes a telephone number for a speed dial function.

21. The device according to claim 17, wherein said location dependent information stored in said memory includes a calendar.

22. The device according to claim 17, wherein said location dependent information stored in said memory includes a clock.

23. The device according to claim 17, wherein said location specific information included in said radio signal includes a time zone.

24. The device according to claim 17, wherein said location specific information included in said radio signal includes a telephone area code associated with said geographic location.

25. The device according to claim 17, wherein said location specific information included in said radio signal includes a date.

26. The device according to claim 17, wherein said location specific information included in said radio signal includes a telephone country code associated with said geographic location.

27. The device according to claim 17, wherein said device is set to receive said radio signals in a predefined range of frequencies based on a country code.

28. The device according to claim 17, wherein said device is Bluetooth™ compliant.

29. The portable device according to claim 17, wherein said radio signal is low powered, and said portable device receives said radio signal by passing through a portal so as to come in close proximity to a base station.

30. The portable device according to claim 17, further comprising reference tables stored in the memory of the portable device, information specific to a current geographic location being retrieved from the reference tables to update said location dependent information stored in memory.

31. A method for updating location dependent information stored in a memory of a portable electronic device, said method comprising the steps of:
   receiving a radio signal automatically from a base station when said portable electronic device comes into range of said base station, said radio signal including location specific information specific to a geographic location in which said base station is situated; and
   updating said location dependent information stored in said memory based on said location specific information without a determination of portable electronic device location and whether said information should be updated.

32. The method according to claim 31, wherein said updating of said location dependent information stored in said memory of said portable electronic device is done automatically without any intervention from a user.

33. The method of claim 31, wherein said location dependent information stored in said memory of said portable electronic device includes a telephone number for a speed dial function.

34. The method of claim 31, wherein said location dependent information stored in said memory of said portable electronic device includes a calendar.

35. The method of claim 31, wherein said location dependent information stored in said memory of said portable electronic device includes a clock.

36. The method of claim 31, wherein said location specific information included in said radio signal includes a time zone.

37. The method of claim 31, wherein said location specific information included in said radio signal includes a telephone area code associated with said respective geographic location.

38. The method of claim 31, wherein said location specific information included in said radio signal includes a date.

39. The method according to claim 31, wherein said location specific information included in said radio signal includes a telephone country code associated with said respective geographic location.

40. The method according to claim 31, wherein said step of receiving further comprises:
   receiving said radio signal in a predefined range of frequencies, said predefined range of frequencies being associated with a specific country code.

41. The method according to claim 31, wherein said radio signal is low powered, and said base station is located in a portal in said respective geographic location such that passengers passing through said portal will come in close proximity to said base station.

42. The method according to claim 31, wherein reference tables stored in the memory of the portable device provide information specific to a current geographic location which is retrieved from the reference tables to update said location dependent information stored in memory.

* * * * *